United States Patent Office 3,270,224
Patented August 30, 1966

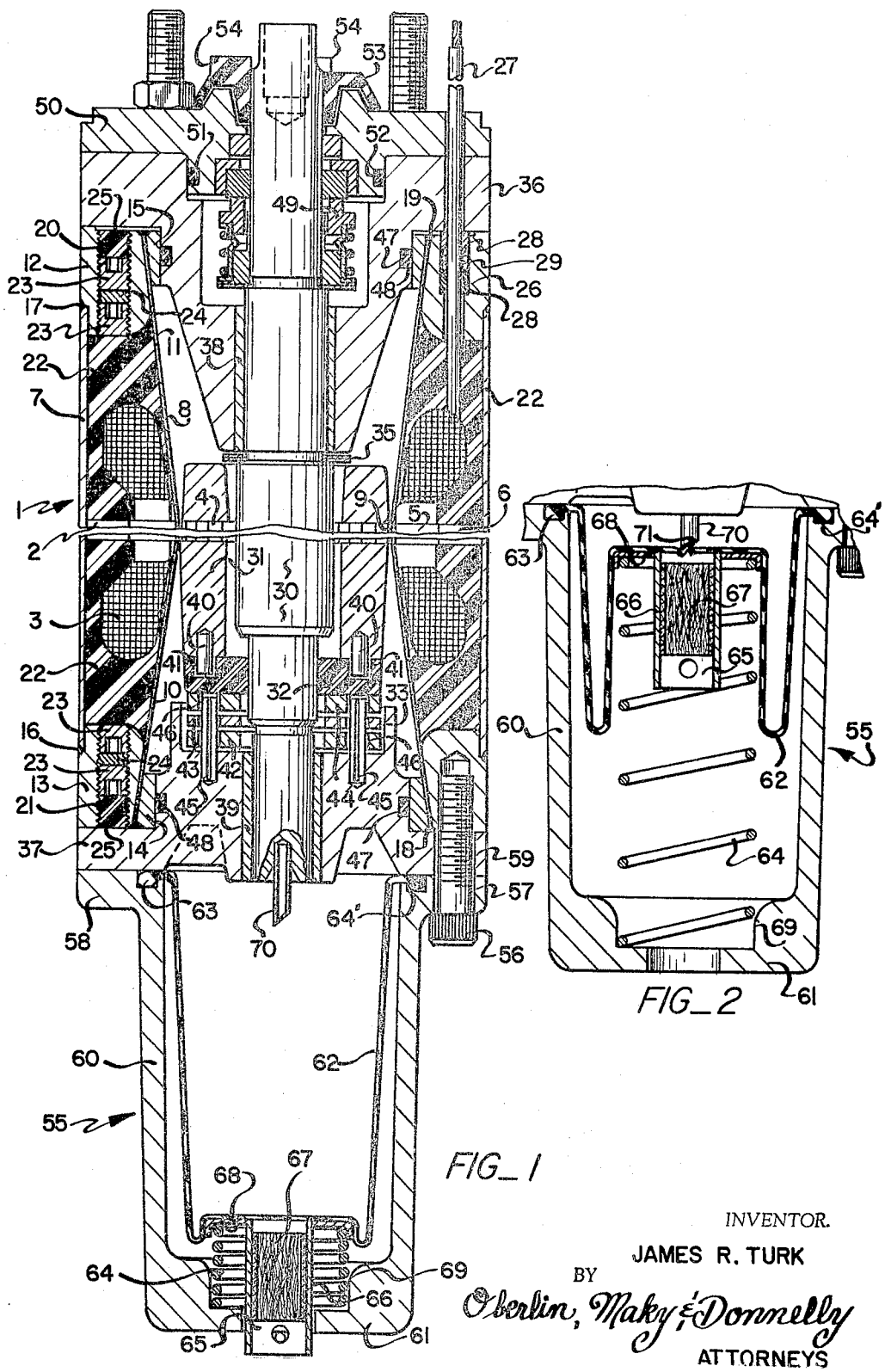

3,270,224
PROTECTIVE CHAMBER PUNCTURE MEANS FOR A SUBMERSIBLE MOTOR
James R. Turk, Solon, Ohio, assignor to Vincent K. Smith, Gates Mills, Ohio
Filed Sept. 13, 1963, Ser. No. 308,738
11 Claims. (Cl. 310—87)

The present invention relates generally as indicated to a submersible electric motor and more particularly to a submersible electric motor having such a construction that it can be both oil lubricated and water lubricated to extend the useful life thereof.

Heretofore, it was necessary in the submersible pump motor industry to lubricate the bearings and seals of such motors in either one of two ways. The first way was to fill the motor casing with oil, preferably under a pressure somewhat greater than the pressure of the water in which the pump was to be submerged so that should the seals leak, the leakage would be in a direction out of the motor casing rather than into it, thus keeping out the water. However, within a short time after the oil has been exhausted from the motor casing as a result of such leakage, the motor burns out.

The second method of lubricating the bearings and seals was to fill the motor casing with the water in which it was to operate in the well. Before water could be used as a lubricator, however, it was necessary to provide a water proof seal about the stator of the motor since any moisture which might come into contact with the stator would cause considerable damage thereto.

This second method is generally less satisfactory than the oil lubricating method because the grit and other foreign material in the water rapidly wear out the bearings of the motor.

Accordingly, it is the principal object of this invention to provide a submersible electric motor which combines the best features of both previously known lubricating methods to substantially increase the motor life over what it has been in the past.

It is another object of this invention to provide a submersible electric motor that has a novel means for converting the same from an oil lubricated motor to a water lubricated motor when the oil is exhausted therefrom.

It is another object of this invention to provide a submersible electric motor that has a means secured to its rotor shaft for forcing water away therefrom.

It is another object of this invention to provide an improved means for maintaining the oil in the motor casing under pressure.

It is another object of this invention to provide an improved seal between the submersible electric motor and the means for maintaining the oil in said motor under pressure.

Another important object of this invention is to provide a stator assembly so constructed that well water externally thereof is sealed from access to the winding and that rotor bearing lubricant internally thereof, whether oil or water, is likewise sealed from access to the windings.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

In said annexed drawings:

FIG. 1 is a central longitudinal cross-section view through an electric motor adapted to be both oil and water lubricated; and FIG. 2 is a central longitudinal cross-section view of the bottom housing of the electric motor of FIG. 1, except that the lubricating oil has been exhausted therefrom and replaced by lubricating water.

Referring now more particularly to FIG. 1 of the drawings, there is illustrated by way of example an induction motor 1 comprising a stator 2 having windings 3 and a squirrel-cage or like rotor 4 therewithin. Preferably, the stator is of the construction disclosed in the Vincent K. Smith Patent No. 2,565,530, dated August 28, 1951, in which there is provided a stack of spider laminations 5 having exterior and axially extending slots into which the stator windings 3 are wound and a stack of yoke laminations 6 which is heat shrunk upon the stack of spider laminations 5 after the coils 3 have been wound in the external slots thereof.

Once the stator 2 is assembled, it is inserted into a stainless steel or like corrosion-resisting tubular shell 7. Next, a thin tubular liner 8, likewise of corrosion-resisting metal, is inserted within the bore 9 of the stator with the ends 10 and 11 of said liner extending beyond both ends of the stator 2. Top and bottom rings 12 and 13 are inserted between the shell 7 and liner 8, the liner ends 10 and 11 being expanded or flared as shown to bear against the frusto-conical internal surfaces of the top and bottom rings 12 and 13. Finally, taper rings 14 and 15 are pressed into place, thus firmly wedging the flared ends 10 and 11 of the liner 8 between said taper rings 14 and 15 and top and bottom rings 12 and 13.

As aforesaid, the shell 7 and the liner 8 are made of a metal, preferably stainless steel, as are the taper rings 14 and 15 and the top and bottom rings 12 and 13, so that these parts may be welded together to insure a fluid-tight fit therebetween. The top and bottom rings 12 and 13 are welded to the shell 7 as at 16 and 17 and to the taper rings over the exposed edge of the liner at 18 and 19, thus effecting a tight, strong enclosure for the stator 2.

Heretofore, when the ends of a thin liner, such as liner 8 herein, were welded to heavy rings, such as rings 12 and 13 herein, a very unsatisfactory weld resulted due to the fact that since said rings were much thicker radially than the liner, the heat of the welding torch would bring said liner up to welding temperature much more quickly than it would the rings. Thus, by the time the heavy rings were brought up to welding temperature, the ends of the liner had melted and such molten metal had the tendency to flow away from the weld area, in which case a very poor weld or no weld at all resulted.

However, applicant has found that if the ends of the liner 8 are tightly wedged between thick top and bottom rings 12 and 13 and thick taper rings 14 and 15, the heating of the joints by a welding torch results in attainment of welding temperature of the three parts at just about the same time. However, even if the liner 8 melts first, the molten metal is retained in the weld area between rings 12 and 13 and taper rings 14 and 15.

The top and bottom rings 12 and 13 are provided with longitudinal openings 20 and 21 through which the entire annular space defined by the shell 7, the liner 8, and the top and bottom rings 12 and 13 is adapted to be filled with an epoxy casting resin 22 having excellent strength, chemical resistance, water resistance, and heat stability.

Such filling operation is preferably performed while the entire stator assembly 2 is in a vacuum chamber, thus resulting in the filling of all interstices in the windings and spaces between the windings and the slots of the spider laminations 5. After filling, the resin in the stator assembly is allowed to cure. Next, set screws 23 are threaded into the openings, said set screws being separated by a lead seal 24. The remaining portion 25 of said openings not sealed by the set screws and lead seal is filled with epoxy resin, thus insuring a watertight seal.

The top ring 12 has a second longitudinal opening 26 through which the stator leads 27 extend for connection to an external power source. Around these stator leads and within the opening are placed two seal washers 28 with two O-ring seals 29 therebetween. The seal washers 28 are made of a flexible plastic material, preferably polyethylene, and the O-rings 29 therebetween are of rubber or rubber-like material.

Next, the rotor 4 and rotor shaft assembly, including rotor shaft 30 having thrust washer 32, and thrust bearing 33 on one end thereof and shim washers 35 on the other end, is inserted into the tubular opening formed by the liner 8, and top and bottom end caps 36 and 37 are pressed into place, said end caps having sleeve bearings 38 and 39 in which the rotor shaft 30 is journalled. The end ring 31 of the rotor has two thrust washer drive pins 40 extending therefrom, which are adapted to be inserted in openings 41 in the thrust washer 32.

The thrust bearing 33 is made up of three sets of segments, a lower equalizer set 42, a middle equalizer set 43, and an upper set 44, said segments being held in their proper positional relationship by means of thrust segment retaining pins 45 extending from the bottom end cap 37 through apertures 46 in said segments. Each of the end caps has a groove 47 in which is placed an O-ring 48 to provide a watertight seal between the taper rings 14 and 15 and the end caps.

Next, a seal 49 is placed on the end of the rotor shaft adjacent the top end cap 36 and a seal retainer 50 is pressed into place, the retainer having a groove 51 in which is placed an O-ring 52 to establish a seal between the top end cap and the retainer. Finally, a slinger 53 is press-fitted over the end of the rotor shaft, the slinger having a tapered outer surface and vanes 54 such that when the rotor shaft is rotated, the vanes 54 will tend to keep the water away from the shaft 30.

The motor is then filled with a lubricating oil and an oil injector 44 is secured to the bottom end cap by means of a plurality of cap screws 56 extending through holes 57 in the flange 58 of the oil injector and threadedly engaged in tapped holes 59 in the bottom end cap. The oil injector 55 consists of a cylindrical housing 60 having a radially outwardly extending flange 58 at one end thereof and an enclosing wall 61 at the other end. Within the housing there is provided a flexible diaphragm 62, preferably made of rubber or rubber-like material, which is filled with a lubricating oil prior to securing the oil injector to the motor. The circumferential edge 63 of the flexible diaphragm 62 is secured in a circular groove 64' in the face of the flange 58 which is adapted to engage the bottom end cap 37 of the motor. The edge of the diaphragm 62 is formed with a bead so that when the oil injector is secured to the bottom end cap a watertight seal is formed as a result of the beaded edge of the diaphragm being compressed into the groove of housing 60 by the bottom end cap 37.

Within the housing 60 is a compression spring 64 and a follower 65 having a cylindrical portion 66 containing a filter 67 and a flange 68 at one end thereof. One end of the compression spring 64 is disposed within a recess 69 in the wall member 61 and the other end is in engagement with the flange of the follower, thus always maintaining the follower in pressure engagement with the diaphragm 62.

Thus it can be seen that the oil within the motor and diaphragm is constantly maintained under pressure, such pressure being exerted by the follower spring 64 through the follower 65 and against the bottom of the diaphragm. Consequently, if any of the seals within the motor should leak, the leakage will always be in a direction out of the motor, thus preventing any water from entering so long as there is sufficient oil pressure present.

When enough oil has leaked out of the motor casing such that the follower spring has moved the diaphragm to the upper end of the bottom housing as viewed in FIG. 1, the follower spring 64 will have forced the diaphragm 62 upwardly sufficiently so that it will be pierced by cutter 70 projecting from the end of the rotor shaft 30. Note in particular FIG. 2 in this respect, which shows the cutter 70 having pierced the diaphragm at 71. When the diaphragm 62 is pierced, water in housing 60 will pass through the filter 67 and the pierced end of the diaphragm to eventually replace the oil that was in the motor.

Since the bearings 38 and 39 work equally well with either oil or water as a lubricant and the stator 2 is sufficiently sealed to prevent any moisture from coming into contact therewith, the water allows the motor to be used for an even greater period of time. Had filtered water not been allowed to enter the motor casing after the oil had been exhausted therefrom due to leakage, however, the motor would have burned out within a relatively short period of time thereafter. Furthermore, had the water been allowed to enter and mix with the oil prior to the time in which substantially all the oil had escaped, the grit particles in the water would have immediately begun to wear out the bearings.

In applicant's motor, water is precluded from entering the motor casing so long as sufficient oil pressure is present. Only when the oil pressure drops to a predetermined level is the diaphragm 62 pierced and water allowed to enter through the filter 67. Thus, the motor herein has a useful life which is at least equivalent to the useful life of an oil lubricated motor plus the useful life of a water lubricated motor.

Other modes of applying the principle of the invention may be employed, change being made as regard the details described, provided the features stated in any of the following claims or the equivalent of such be employed.

I therefore, particularly point out and distinctly claim as my invention:

1. A submersible electric motor comprising a tubular shell, a stator assembly contained within the said shell, a liner disposed within said stator assembly, said shell and liner extending beyond the ends of the stator assembly, ring members inserted between the ends of said shell and liner, taper rings inserted within said ring members so that the ends of said liner are securely held between the ring members and taper rings, means for providing a waterproof seal between said ring members and said shell and liner, a rotor and rotor shaft assembly disposed in said liner, end caps positioned adjacent said ring members and taper rings, said end caps having bearings in which said rotor shaft is journalled, a piercing means projecting from one end of said rotor shaft, an oil injector secured to the end cap adjacent said piercing means, said oil injector including a cup-shaped housing secured at its open end to the adjacent end cap, a wall member enclosing the other end, a flexible diaphragm within said housing, said diaphragm being filled with a lubricating oil, means within said housing for applying pressure to said diaphragm to force the same toward said piercing means, thus forcing the oil contained within said diaphragm into that part of the motor disposed within said liner, and an opening in the wall member of said housing to allow water to enter and thus occupy the space between the diaphragm and the housing.

2. The submersible electric motor of claim 1 including at least one axially extending hole in each of said ring members through which the unoccupied space within the enclosure defined by said ring members and said shell and liner is filled with a waterproof epoxy resin, said hole having been subsequently filled with a sealing means.

3. The submersible electric motor of claim 1 including an axially extending hole in one of said ring members through which lead wires for connecting the stator assembly to an external power source extend and the remainder of the space in said hole not occupied by said lead wires is plugged with a watertight seal means.

4. The submersible electric motor of claim 1 wherein each of said end caps has a circular groove in the outer surfaces thereof adjacent said taper rings and each of said grooves has an O-ring therein, said O-rings being adapted to form a watertight seal between said end caps and taper rings.

5. The submersible electric motor of claim 1 wherein said waterproof seal between the ring members and the shell and liner comprises a welded joint.

6. The submersible electric motor of claim 1 further including a vaned slinger in frictional engagement with the other end of said rotor shaft operative when said rotor shaft and slinger rotate, to keep water from said shaft.

7. The submersible electric motor of claim 1 including a follower within said housing, said follower comprising a cylindrical member having a radially outwardly projecting flange at one end thereof, said flange being held in engagement with said diaphragm by the spring.

8. The submersible electric motor of claim 7 and further including a filter disposed within said cylindrical member, said filter being adapted to remove grit particles and foreign matter from the water.

9. A submersible electric motor comprising a stator assembly, means establishing a fluidtight seal around said stator assembly, a rotor assembly disposed within said stator assembly for relative rotation therebetween, means providing a fluid seal at the first end of said rotor assembly, piercing means projecting from the second end of said motor, an oil ejector means enclosing the second end of said rotor assembly and surrounding said piercing means, said oil ejector means including a flexible diaphragm containing lubricating oil, and means for applying pressure to said diaphragm to urge the same toward said second end of said rotor assembly to force such oil into said rotor assembly, and when substantially all of such oil has leaked out of said rotor assembly, to force said diaphragm into contact with said piercing means to pierce said diaphragm for allowing water to enter through said diaphragm into said rotor assembly.

10. The submersible electric motor of claim 9 wherein said means for applying pressure to said diaphragm includes a cylindrical follower having a radially outwardly projecting flange at one end in engagement with said diaphragm, and a spring means engaging said flange for urging said diaphragm toward said motor.

11. The submersible electric motor of claim 9 wherein said means establishing a fluidtight seal around said stator assembly comprises a tubular metal shell in which said stator assembly is contained, a thin metal liner disposed within said stator assembly, said shell and liner extending beyond the ends of said stator assembly, metal ring members inserted between said shell and liner adjacent the ends of said stator assembly, said ring members having tapered internal surfaces engaged by the ends of said liner, metal rings having external tapered surfaces corresponding to said internal tapered surfaces of said ring members inserted within said liner ends for tightly wedging said liner ends between said ring members and rings, and weld means between said ring members, rings, and shell and liner for providing a watertight seal therebetween.

References Cited by the Examiner

UNITED STATES PATENTS

| | | | |
|---|---|---|---|
| 1,543,502 | 6/1925 | Hobart | 310—86 |
| 2,359,215 | 9/1944 | Gold | 310—87 |
| 2,463,936 | 3/1949 | Allison | 310—87 |
| 2,485,408 | 10/1949 | Pezzillo | 310—86 |
| 2,669,187 | 2/1954 | Guyer | 310—86 |
| 2,739,252 | 3/1956 | Patterson | 310—87 |
| 2,741,990 | 4/1956 | White | 310—86 |

MILTON O. HIRSHFIELD, *Primary Examiner.*

ORIS L. RADER, *Examiner.*

J. W. GIBBS, *Assistant Examiner.*